(12) United States Patent
Yoo et al.

(10) Patent No.: US 11,332,631 B2
(45) Date of Patent: *May 17, 2022

(54) FILM-PRINTABLE ULTRAVIOLET-RAY-CURABLE INK COMPOSITION, BEZEL PATTERN MANUFACTURING METHOD USING SAME, BEZEL PATTERN MANUFACTURED ACCORDING TO SAME, AND DISPLAY SUBSTRATE INCLUDING SAME

(71) Applicant: LG Chem, Ltd., Seoul (KR)

(72) Inventors: Jaehyun Yoo, Daejeon (KR); Hyeok Jeong, Daejeon (KR)

(73) Assignee: LG Chem, Ltd.

(*) Notice: Subject to any disclaimer, the term of this patent is extended or adjusted under 35 U.S.C. 154(b) by 0 days.

This patent is subject to a terminal disclaimer.

(21) Appl. No.: 16/960,701

(22) PCT Filed: Aug. 13, 2019

(86) PCT No.: PCT/KR2019/010325
§ 371 (c)(1),
(2) Date: Jul. 8, 2020

(87) PCT Pub. No.: WO2020/036422
PCT Pub. Date: Feb. 20, 2020

(65) Prior Publication Data
US 2020/0399484 A1 Dec. 24, 2020

(30) Foreign Application Priority Data
Aug. 17, 2018 (KR) .................. 10-2018-0095806

(51) Int. Cl.
*C09D 11/101* (2014.01)
*B41M 5/00* (2006.01)
(Continued)

(52) U.S. Cl.
CPC ......... *C09D 11/101* (2013.01); *B41M 5/0023* (2013.01); *C09D 11/033* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102;
(Continued)

(56) References Cited

U.S. PATENT DOCUMENTS

2010/0013899 A1   1/2010  Matsumura
2010/0068407 A1*  3/2010  Jeremie ................ C09D 11/101
                                                      427/511
(Continued)

FOREIGN PATENT DOCUMENTS

CN    104471481 A    3/2015
CN    107001838 A    8/2017
(Continued)

OTHER PUBLICATIONS

Taiwan Search Report for Application No. 108129112 completed on May 5, 2020, 1 page.
International Search Report for Application No. PCT/KR2019/010325 dated Dec. 5, 2019, 3 pages.
Search Report for Chinese Application No. 20 1980006256.4 dated Nov. 17, 2021. 1 pg.

*Primary Examiner* — Manish S Shah
(74) *Attorney, Agent, or Firm* — Lerner, David, Littenberg, Krumholz & Mentlik, LLP

(57) ABSTRACT

An ultraviolet curable ink composition for forming a bezel pattern of a foldable display substrate, methods of using the same, a bezel pattern formed from the same, and a foldable display substrate include the bezel pattern are disclosed herein. In some embodiments, an ultraviolet curable ink composition includes a black pigment, a dispersant, an alicyclic epoxy compound, an oxetane compound, a photosensitizer, a photopolymerization initiator, and an organic solvent, wherein a weight ratio of the photosensitizer to the photopolymerization initiator is 1:1 to 1:2, and a sum of the amounts of the photosensitizer and the photopolymerization initiator is 13 to 21 parts by weight based on 100 parts by weight of a sum of the amounts of the alicyclic epoxy compound and the oxetane compound. The ink composition is capable of forming a bezel pattern having a diminished thickness and excellent light blocking properties.

18 Claims, No Drawings

(51) Int. Cl.
  *C09D 11/033* (2014.01)
  *C09D 11/037* (2014.01)
  *C09D 11/102* (2014.01)
  *C09D 11/326* (2014.01)
  *C09D 11/36* (2014.01)
  *C09D 11/38* (2014.01)

(52) U.S. Cl.
  CPC ........... *C09D 11/037* (2013.01); *C09D 11/102* (2013.01); *C09D 11/326* (2013.01); *C09D 11/36* (2013.01); *C09D 11/38* (2013.01)

(58) Field of Classification Search
  CPC ....... C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227
  See application file for complete search history.

(56) References Cited

U.S. PATENT DOCUMENTS

| | | | | |
|---|---|---|---|---|
| 2013/0176369 A1* | 7/2013 | Gotou | .................... | B41J 2/2107 347/100 |
| 2013/0308219 A1* | 11/2013 | Kunimoto | ............ | C07D 327/06 359/891 |
| 2014/0186592 A1* | 7/2014 | Jeon | ..................... | G03F 7/0047 428/195.1 |
| 2015/0111009 A1 | 4/2015 | Choi et al. | | |
| 2015/0115247 A1* | 4/2015 | Nishimura | ........... | C09D 179/04 257/40 |
| 2016/0108263 A1 | 4/2016 | Yoo et al. | | |
| 2017/0158812 A1 | 6/2017 | Mizuta et al. | | |
| 2017/0218212 A1* | 8/2017 | Park | ....................... | B41J 11/002 |
| 2017/0227844 A1* | 8/2017 | Park | ....................... | C08L 63/00 |
| 2017/0298241 A1 | 10/2017 | Park et al. | | |
| 2019/0258164 A1* | 8/2019 | Tanigaki | ................. | G03F 7/322 |
| 2019/0264051 A1 | 8/2019 | Yoo et al. | | |
| 2020/0157368 A1* | 5/2020 | Park | ..................... | C09D 11/101 |
| 2021/0079239 A1 | 3/2021 | Yoo et al. | | |

FOREIGN PATENT DOCUMENTS

| | | |
|---|---|---|
| CN | 111212880 A | 5/2020 |
| JP | 2006328297 A | 12/2006 |
| JP | 2010235640 A | 10/2010 |
| JP | 5106285 B2 | 12/2012 |
| JP | 5761928 B2 | 8/2015 |
| JP | 2016027122 A | 2/2016 |
| JP | 2016199034 A | 12/2016 |
| KR | 20150143071 A | 12/2015 |
| KR | 20160046723 A | 4/2016 |
| KR | 20160071336 A | 6/2016 |
| KR | 20160147535 A | 12/2016 |
| KR | 101835299 B1 | 3/2018 |
| KR | 20180039556 A | 4/2018 |
| WO | 2018070654 A1 | 4/2018 |

\* cited by examiner

FILM-PRINTABLE ULTRAVIOLET-RAY-CURABLE INK COMPOSITION, BEZEL PATTERN MANUFACTURING METHOD USING SAME, BEZEL PATTERN MANUFACTURED ACCORDING TO SAME, AND DISPLAY SUBSTRATE INCLUDING SAME

CROSS-REFERENCE TO RELATED APPLICATION(S)

The present application is a National Phase entry under 35 U.S.C. § 371 of International Application No. PCT/KR2019/010325, filed on Aug. 13, 2019, which claims priority from Korean Patent Application No. 10-2018-0095806, filed on Aug. 17, 2018, the disclosures of which are incorporated by reference herein.

BACKGROUND OF THE INVENTION

1. Field of the Invention

The present invention relates to a film printable ultraviolet curable ink composition, a method for producing a bezel pattern using the same, a bezel pattern manufactured thereby, and a display substrate comprising the same.

2. Description of the Related Art

The flexible display market is evolving from flat and curved products to foldable products that can be folded and unfolded freely. Like other display devices, the foldable display devices require a bezel pattern which give colors and in which the pattern in non-display area of panel is not visually recognized. Mobile devices are close to human eyes because of their characteristics, and therefore, bezels with high light-shielding characteristics should be formed to prevent light leakage and recognition of panel patterns. If the bezel is thick, there is a problem that the bezel step is visually recognized on the screen and bubbles are not released when an optically clear adhesive (OCA) is attached. For this reason, a bezel pattern with low thickness and excellent light-shielding characteristics is required. In addition, in order to reduce process costs, an ink composition which enables to form a bezel pattern by 1 layer printing of high light-shielding black ink is required.

PRIOR ART DOCUMENT

Patent Document (Patent Document 1) KR 10-2016-0147535 A

SUMMARY OF THE INVENTION

An object of the present invention is to provide a film printable ultraviolet curable ink composition which enables to form a bezel pattern having a low thickness and excellent light-shielding properties such that a panel pattern of a foldable display device such as a mobile device is not visually recognized and light leakage is not occurred, a method for producing a bezel pattern using the same, a bezel pattern manufactured thereby, and a display substrate comprising the same.

Another object of the present invention is to provide a film printable ultraviolet curable ink composition which enables to form a bezel pattern by 1 layer printing of high-shielding black ink in order to reduce process costs, a method for producing a bezel pattern using the same, a bezel pattern manufactured thereby, and a display substrate comprising the same.

In order to achieve the above objects, the present invention provides an ultraviolet curable ink composition for forming a bezel pattern of a display substrate, comprising a black pigment, a dispersant, an alicyclic epoxy compound, an oxetane compound, a photosensitizer, a photopolymerization initiator, and an organic solvent, wherein a weight ratio of the photosensitizer to the photopolymerization initiator is 1:1 to 1:2, and a sum of the amounts of the photosensitizer and the photopolymerization initiator is 13 to 21 parts by weight based on 100 parts by weight of a sum of the amounts of the alicyclic epoxy compound and the oxetane compound.

In addition, the present invention provides a method for producing a bezel pattern for a display substrate, comprising:

a) printing the ultraviolet curable ink composition on a substrate in the shape of a bezel pattern; and b) curing the ink composition to form the bezel pattern.

In addition, the present invention provides a bezel pattern manufactured according to the method for producing a bezel pattern.

In addition, the present invention provides a display substrate comprising the bezel pattern.

Effect of the Invention

The film printable ultraviolet curable ink composition according to the present invention can be applied to a method for manufacturing a bezel pattern of a foldable display device. In addition, a bezel pattern having a low thickness (e.g., <5 μm) which is formed by 1 layer printing of high light-shielding ink (e.g., O.D.>4) on various films can be cured with a low UV dose (e.g., <2,000 mJ/cm$^2$) and has excellent bezel properties (folding, adhesion, pattern).

DETAILED DESCRIPTION OF THE INVENTION

Hereinafter, the present invention will be described in more detail.

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

The present invention provides an ultraviolet curable ink composition comprising a black pigment, a dispersant, an alicyclic epoxy compound, an oxetane compound, a photosensitizer, a photopolymerization initiator and an organic solvent, wherein a weight ratio of the photosensitizer to the photopolymerization initiator is 1:1 to 1:2, and a sum of the amounts of the photosensitizer and the photopolymerization initiator is 13 to 21 parts by weight based on 100 parts by weight of a sum of the amounts of the alicyclic epoxy compound and the oxetane compound.

In addition, in one embodiment of the present invention, the weight ratio of the alicyclic epoxy compound to the oxetane compound may be 1:4 to 1:8.

The ultraviolet curable ink composition comprises a black pigment as a colorant.

In one embodiment of the present invention, carbon black, graphite, metal oxides, organic black pigments and the like can be used as the black pigment.

Examples of carbon black include Cisto 5HIISAF-HS, Cisto KH, Cisto 3HHAF-HS, Cisto NH, Cisto 3M, Cisto 300HAF-LS, Cisto 116HMMAF-HS, Cisto 116MAF, Cisto FMFEF-HS, Cisto SOFEF, Cisto VGPF, Cisto SVHSRF-HS, and Cisto SSRF (Donghae Carbon Co., Ltd.); diagram black II, diagram black N339, diagram black SH, diagram black H, diagram LH, diagram HA, diagram SF, diagram N550M, diagram M, diagram E, diagram G, diagram R, diagram N760M, diagram LR, #2700, #2600, #2400, #2350, #2300, #2200, #1000, #980, #900, MCF88, #52, #50, #47, #45, #45L, #25, #CF9, #95, #3030, #3050, MA7, MA77, MA8, MA11, MA100, MA40, OIL7B, OIL9B, OIL11B, OIL30B and OIL31B (Mitsubishi Chemical Corporation); PRINTEX-U, PRINTEX-V, PRINTEX-140U, PRINTEX-140V, PRINTEX-95, PRINTEX-85, PRINTEX-75, PRINTEX-55, PRINTEX-45, PRINTEX-300, PRINTEX-35, PRINTEX-25, PRINTEX-200, PRINTEX-40, PRINTEX-30, PRINTEX-3, PRINTEX-A, SPECIAL BLACK-550, SPECIAL BLACK-350, SPECIAL BLACK-250, SPECIAL BLACK-100, and LAMP BLACK-101 (Degussa Co., Ltd.); RAVEN-1100ULTRA, RAVEN-1080ULTRA, RAVEN-1060ULTRA, RAVEN-1040, RAVEN-1035, RAVEN-1020, RAVEN-1000, RAVEN-890H, RAVEN-890, RAVEN-880ULTRA, RAVEN-860ULTRA, RAVEN-850, RAVEN-820, RAVEN-790ULTRA, RAVEN-780ULTRA, RAVEN-760ULTRA, RAVEN-520, RAVEN-500, RAVEN-460, RAVEN-450, RAVEN-430ULTRA, RAVEN-420, RAVEN-410, RAVEN-2500ULTRA, RAVEN-2000, RAVEN-1500, RAVEN-1255, RAVEN-1250, RAVEN-1200, RAVEN-1190ULTRA, RAVEN-1170 (Columbia Carbon Co.), mixtures thereof, or the like.

The organic black pigment includes carbon black, lactam black, perylene black, and the like, but is not limited thereto.

The content of the black pigment is 5 to 25% by weight, or 10 to 20% by weight based on the total weight of the ultraviolet curable ink composition. If the content of the black pigment is less than 5% by weight, a level of optical density (OD) applicable to the bezel pattern may not be obtained. If it exceeds 25% by weight, the viscosity of the ink may become too high or an excessive amount of the black ink may not be dispersed in the ink, so that precipitates may be formed.

The ultraviolet curable ink composition comprises a dispersant.

The dispersant is used to make the black pigment into particles of uniform size and to shorten the production time of the ink. The dispersant may be a polymeric, nonionic, anionic or cationic dispersant, and examples thereof include acrylics, polyalkylene glycols and esters thereof, polyoxyalkylene polyhydric alcohols, ester alkylene oxide adducts, alcohol alkylene oxide adducts, sulfonic acid esters, sulfonates, carboxylic acid esters, carboxylates, alkylamide alkylene oxide adducts and alkylamines; and the like, which may be used alone or in combination of two or more thereof. It is preferable to use an acrylic dispersant having excellent ink storage property.

The content of the dispersant is 0.5 to 5% by weight, or 2 to 4% by weight, or about 3% by weight based on the total weight of the ink composition. If the content of the dispersant is less than 0.5% by weight based on the total weight of the ink composition, the pigment may not be uniformly distributed. If it exceeds 5% by weight, the pigment may aggregate or the curing sensitivity may decrease.

The ultraviolet curable ink composition comprises an alicyclic epoxy compound.

The alicyclic epoxy compound is a cationic polymerizable compound and may be one or a mixture of two selected from alicyclic epoxy compounds containing a cationic polymerizable alicyclic epoxy monomer. Such an alicyclic epoxy compound may contain one or two epoxidized aliphatic ring groups. The epoxidized aliphatic ring group may be a compound having an epoxy group bonded to an alicyclic ring, and a hydrogen atom of the alicyclic ring may be substituted with a substituent such as an alkyl group.

The alicyclic epoxy compound, i.e., the epoxy compound includes, but is not limited to, dicyclopentadiene dioxide, limonene dioxide, (3,4-epoxycyclohexyl)methyl-3,4-epoxycyclohexanecarboxylate, 3-vinylcyclohexene oxide, bis(2,3-epoxycyclopentyl)ether, bis(3,4-epoxycyclohexylmethyl)adipate, bis(3,4-epoxy-6-methylcyclohexylmethyl)adipate, (3,4-epoxycyclohexyl)methyl alcohol, (3,4-epoxy-6-methylcyclohexyl)methyl-3,4-epoxy-6-methylcyclohexanecarboxylate, ethylene glycol bis(3,4-epoxycyclohexyl)ether, 3,4-epoxycyclohexene carboxylic acid ethylene glycol diester and (3,4-epoxycyclohexyl)ethyltrimethoxysilane.

The content of the alicyclic epoxy compound may be 2 to 15% by weight, or 3 to 10% by weight, or about 6% by weight based on the total weight of the ink composition. If the content of the alicyclic epoxy compound is less than 2% by weight based on the total ink composition, curing sensitivity may decrease. If it exceeds 15% by weight, surface wrinkles may be generated after UV curing, resulting in the reduced bezel properties.

The ultraviolet curable ink composition comprises an oxetane compound as another cationic polymerizable monomer.

The oxetane compound is a compound having a 4-membered cyclic ether group in its molecular structure, and is used to reduce the viscosity of the cationic polymerizable ink composition. Examples thereof include 3-ethyl-3-hydroxymethyloxetane, 1,4-bis[(3-ethyl-3-oxetanyl)methoxymethyl]benzene, 3-ethyl-3-(phenoxymethyl)oxetane, di[(3-ethyl-3-oxetanyl)methyl]ether, 3-ethyl-3-(2-ethylhexyloxymethyl)oxetane, 3-ethyl-3-cyclohexyloxymethyl oxetane and phenol novolak oxetane and commercially available products thereof include "ARON OXETANE OXT-101", "ARON OXETANE OXT-121", "ARON OXETANE OXT-211", "ARON OXETANE OXT-221", "ARON OXETANE OXT-212" and the like from Toagosei Co., Ltd. These may be used alone or in combination of two or more.

The content of the oxetane compound is 25 to 50% by weight, or 30 to 45% by weight, or 34 to 42% by weight based on the total weight of the ink composition. If the content of the oxetane compound is less than 25% by weight based on the total weight of the ink composition, the viscosity of the ink composition may increase to deteriorate inkjet processability. If it exceeds 50% by weight, curing sensitivity may decrease.

In addition, the weight ratio of the alicyclic epoxy compound to the oxetane compound in the composition according to the present invention may be 1:4 to 1:8, in another embodiment, 1:4.5 to 1:7 or 1:5 to 1:6.8. If the ratio of the epoxy compound to the oxetane compound exceeds 1:8, inkjet processability of the composition may be excellent due to low viscosity of the composition, but curing sensitivity may be lowered. If the ratio is less than 1:4, inkjet processability may be deteriorated due to high viscosity of the composition and surface wrinkles may be occurred in the coating film after UV curing.

The ultraviolet curable ink composition comprises a photosensitizer.

The photosensitizer may be at least one selected from the group consisting of anthracene-based compounds such as anthracene, 9,10-dibutoxyanthracene, 9,10-dimethoxyanthracene, 9,10-diethoxyanthracene and 2-ethyl-9,10-dimethoxyanthracene; benzophenone-based compounds such as benzophenone, 4,4-bis(dimethylamino)benzophenone, 4,4-bis(diethylamino)benzophenone, 2,4,6-trimethylaminobenzophenone, methyl-o-benzoyl benzoate, 3,3-dimethyl-4-methoxybenzophenone and 3,3,4,4-tetra(t-butylperoxycarbonyl)benzophenone; ketone-based compound such as acetophenone, dimethoxyacetophenone, diethoxyacetophenone, 2-hydroxy-2-methyl-1-phenylpropan-1-one and propanone; perylene; fluorenone-based compounds such as 9-fluorenone, 2-chloro-9-fluorenone and 2-methyl-9-fluorenone; thioxanthone-based compounds such as thioxanthone, 2,4-diethyl thioxanthone, 2-chlorothioxanthone, 1-chloro-4-propyloxy thioxanthone, isopropylthioxanthone(ITX) and diisopropylthioxanthone; xanthone-based compounds such as xanthone and 2-methylxanthone; anthraquinone-based compounds such as anthraquinone, 2-methyl anthraquinone, 2-ethyl anthraquinone, t-butyl anthraquinone and 2,6-dichloro-9,10-anthraquinone; acridine-based compounds such as 9-phenylacridine, 1,7-bis(9-acridinyl)heptane, 1,5-bis(9-acridinylpentane) and 1,3-bis (9-acridinyl)propane; dicarbonyl compounds such as 1,7,7-trimethyl-bicyclo[2,2,1]heptan-2,3-dione and 9,10-phenanthrenequinone; phosphine oxide-based compounds such as 2,4,6-trimethylbenzoyldiphenylphosphine oxide and bis(2,6-dimethoxybenzoyl)-2,4,4-trimethylpentylphosphine oxide; benzoate-based compounds such as methyl-4-(dimethylamino)benzoate, ethyl-4-(dimethylamino)benzoate and 2-n-butoxyethyl-4-(dimethylamino)benzoate; amino synergists such as 2,5-bis(4-diethylaminobenzal)cyclopentanone, 2,6-bis(4-diethylaminobenzal)cyclohexanone and 2,6-bis(4-diethylaminobenzal)-4-methyl-cyclopentanone; coumarine-based compounds such as 3,3-carbonylvinyl-7-(diethylamino)coumarine, 3-(2-benzothiazolyl)-7-(diethylamino) coumarine, 3-benzoyl-7-(diethylamino)coumarine, 3-benzoyl-7-methoxy-coumarine and 10,10-carbonylbis[1, 1,7,7-tetramethyl-2,3,6,7-tetrahydro-1H,5H,11H—C1]-bezopyrano[6,7,8-i,j]-quinolizin-11-one; chalcone compounds such as 4-diethylamino chalcone and 4-azidobenzalacetophenone; 2-benzoylmethylene-3-methyl-β-naphtothiazoline.

The content of the photosensitizer is 1 to 5% by weight, and in another embodiment 2 to 4% by weight based on the total weight of the ultraviolet curable ink composition. If the content of the photosensitizer is less than 1% by weight, a synergistic effect of curing sensitivity at a desired wavelength could not be expected. If it exceeds 5% by weight, the photosensitizer may not be dissolved and the adhesive strength and crosslinking density of the pattern may be lowered.

The ultraviolet curable ink composition comprises a photopolymerization initiator.

The photopolymerization initiator is a compound generating cationic species or Bronsted acid by irradiation with ultraviolet rays and, for example, it comprises an iodonium salt and a sulfonium salt, but it is not limited thereto.

The iodonium salt or the sulfonium salt may cause a curing reaction in which monomers having an unsaturated double bond contained in the ink are reacted to form a polymer during UV curing process, and a photosensitizer may be used depending on the polymerization efficiency.

For example, the photopolymerization initiator may include compounds having an anion represented by $SbF_{6-}$, $AsF_{6-}$, $BF_{6-}$, $(C_6F_5)_4B—$, $PF_{6-}$ or $Rf_nF_{6-n}$, but is not necessarily limited thereto.

In one embodiment of the invention, triarylsulphonium salts having excellent high-temperature stability may be used for storage stability of the ink, for example triarylsulfonium hexafluorphosphate salts may be used.

The photopolymerization initiator may be contained in an amount of 1 to 15% by weight relative to the total weight of the ultraviolet curable ink composition, in another embodiment in an amount of 2 to 10% by weight or 3 to 5% by weight. If the content of the photopolymerization initiator is less than 1% by weight, the curing reaction may be insufficient, and if it exceeds 15% by weight, it may not be completely dissolved or the viscosity may increase and the coatability may decrease.

In the composition according to the present invention, due to the nature of black pigment, the higher the light-shielding properties, the higher the frequency of occurrence of surface wrinkles, because of the difference in curing rate. Therefore, by optimizing the content ratio of the photopolymerization initiator and the photosensitizer that absorb light, it is possible to form a bezel with a low UV dose (e.g., <2,000 $mJ/cm^2$). For this purpose, the weight ratio of the photosensitizer to the photopolymerization initiator may be 1:1 to 1:2 or 1:1.5 to 1:1.8, and a sum of the amounts of the photosensitizer and the photopolymerization initiator may be 13 to 21 parts by weight or 15 to 20 parts by weight based on 100 parts by weight of a sum of the amounts of the alicyclic epoxy compound and the oxetane compound.

The ultraviolet curable ink composition comprises an organic solvent.

The organic solvent is an essential component for the ink composition according to the present invention to maintain low thickness while exhibiting high light-shielding properties after curing. The organic solvent may be used without particular limitation as long as it has excellent curing sensitivity even after the bezel pattern is printed on the display substrate using the ink composition according to the present invention. However, in order to improve inkjet processability, it is preferable to use the organic solvent having a boiling point of 200° C. or more and a viscosity of 1 to 5 cP, or 1 to 3 cP at 25° C.

When the black pigment according to the present invention is contained in a low content of less than 10% (particularly 7% or less) in the total weight of the ink composition, there is no big problem in the inkjet processability, even if an organic solvent such as ethylene glycol monobutyl ether acetate (BCsA) having a boiling point of less than 200° C. is used. However, when the black pigment is contained in a relatively high content of 10% or more, the inkjet processability is lowered.

Therefore, in the present invention, it is required to use an organic solvent which enables to enhance or improve the inkjet processability. The inkjet processability is improved as the use of an organic solvent satisfying the conditions of high boiling point and low viscosity as described above (a boiling point of 200° C. or higher and a viscosity of 1 to 5 cP, particularly 3 cP or less at 25° C.). Therefore, an organic solvent satisfying such conditions, for example, butyl diglyme (or diethylene glycol dibutyl ether), dipropylene glycol methyl ether acetate, ethylene glycol dibutyrate, diethyl succinate, gamma-butyrolactone (GBL) and ethyl caprate should be used, and it is preferable to use butyl diglyme and diethyl succinate.

The content of the organic solvent is 10 to 40% by weight, or 15 to 30% by weight, or 20 to 25% by weight based on the total weight of the ink composition. If the content of the organic solvent is less than 10% by weight, the viscosity of the ink may increase or the thickness of the bezel layer may become thick. If it exceeds 40% by weight, curing sensitivity may be lowered.

Meanwhile, the ink composition according to the present invention may further comprise any one or more of a reactive diluent, an adhesion promoter, a surfactant, and a photopolymerization initiator solvent, as necessary.

The reactive diluent may be included to lower the viscosity of the ink to improve inkjet processability, and a cationic polymerizable glycidyl ether epoxy compound and vinyl epoxy compound may be used. Examples of the glycidyl ether epoxy compound include N-butyl glycidyl ether, neopentyl glycol diglycidyl ether (LD203), aliphatic glycidyl ether, 2-ethylhexyl glycidyl ether, phenyl glycidyl ether, cresyl glycidyl ether, benzyl glycidyl ether, 1,4-butanediol glycidyl ether, ethylene glycol diglycidyl ether, 1,6-hexanediol glycidyl ether, 1,4-cyclohexane dimethanol diglycidyl ether, polypropylene glycol diglycidyl ether, diethylene glycol diglycidyl ether. Examples of the vinyl epoxy compound include 1,4-cyclohexanedimethanol divinyl ether, triethylene glycol divinyl ether (DVE-3), and hydroxybutyl vinyl ether. These can be used alone or in a mixture of two or more.

The content of the reactive diluent is preferably 0 to 10% by weight, more preferably 1 to 7% by weight based on the total weight of the ultraviolet curable ink composition. If it exceeds 10% by weight, surface wrinkles may be generated in the coating film after UV curing.

The adhesion promoter can improve adhesion between the substrate and the printed layer. The adhesion promoter may be at least one selected from the group consisting of an alkoxysilane compound and phosphate-based acrylate such as phosphate acrylate. Examples of the alkoxysilane compound include 3-glycidoxypropyl trimethoxysilane (KBM-403 (Shin-Etsu Chemical Co., Ltd., USA)), 3-glycidoxypropyl methyldimethoxysilane (KBM-402), 2-(3,4-epoxycyclohexyl)ethyltrimethoxysilane (KBM-303), 3-glycidoxypropyl methyldiethoxysilane (KBE-402), 3-glycidoxypropyl triethoxysilane (KBE-403), 3-methacryloxypropyl trimethoxysilane (KBM-503) and the like, which may be used alone or in combination of two or more.

In case that the adhesion promoter is used, the content thereof is 1 to 5% by weight, or 2 to 4% by weight based on the total weight of the ink composition. If the content of the adhesion promoter is less than 1% by weight, adhesion between the substrate and the printed layer may decrease. If it exceeds 5% by weight, curing sensitivity may be lowered and stability of the ink may decrease.

As the surfactant, the commercial available product may be used, for example it is selected from the group consisting of Megafack F-444, F-475, F-478, F-479, F-484, F-550, F-552, F-553, F-555, F-570 and RS-75 from DIC(DaiNippon Ink & Chemicals), or Surflon S-111, S-112, S-113, S-121, S-131, S-132, S-141 and S-145 from Asahi Glass Co., Ltd., or Fluorad FC-93, FC-95, FC-98, FC-129, FC-135, FC-170C, FC-430 and FC-4430 from Sumitomo 3M Co., Ltd., or Zonyl FS-300, FSN, FSN-100 and FSO from DuPont, or BYK-306, BYK-307, BYK-310, BYK-320, BYK-330, BYK-331, BYK-333, BYK-342, BYK-350, BYK-354, BYK-355, BYK-3550, BYK-356, BYK-358N, BYK-359, BYK-361N, BYK-381, BYK-370, BYK-371, BYK-378, BYK-388, BYK-392, BYK-394, BYK-399, BYK-3440, BYK-3441, BYK-UV3530 and BYK-UV3570 from BYK, or Rad 2100, Rad 2011, Glide 100, Glide 410, Glide 450, Flow 370, Flow 425 and Wet 500 from TEGO.

The surfactant may be contained in an amount of 0.01 to 2.0 wt %, or 0.1 to 1.0 wt %, based on the total weight of the ultraviolet curable ink composition. If the content of the surfactant is less than 0.01% by weight, the effect of lowering the surface tension of the composition is not sufficient, so that coating failure occurs when the composition is coated on the substrate. If it exceeds 2.0% by weight, the surfactant is used in an excessive amount and there is a problem that the compatibility and anti-foaming of the composition is rather reduced.

The photopolymerization initiator solvent may be used without limitation as long as it is a solvent capable of dissolving the initiator due to high solubility, and it is at least one selected from the group consisting of propylene carbonate, gamma butyrolactone (GBL), and N-ethyl pyrrolidone (NEP), but is not necessarily limited thereto.

The content of the photopolymerization initiator solvent may be 50 to 150% by weight, or 75 to 125% by weight based on the content of the photopolymerization initiator. If it is less than 50% by weight, the photopolymerization initiator may not be dissolved, so that precipitates may be formed. If it exceeds 150% by weight, curing sensitivity is lowered.

The ultraviolet curable ink composition (or ink) according to the present invention has a curing dose of 100 to 5,000 mJ/cm$^2$, or 200 to 3,000 mJ/cm$^2$ and is cured by absorbing radiation in the wavelength range of 250 to 410 nm, preferably 360 to 410 nm. Furthermore, in order to be suitable for an inkjet process, it has a viscosity of, for example, 1 to 30 cP at 25° C., or 2 to 20 cP at a process temperature. The adhesive force to the substrate without the post-process (heat treatment) is 4B or more or 5B or more in the cross cut test, and with regard to folding properties, no crack occurs when folding 100,000 times or more at a folding radius of 2.5R after UV curing.

In addition, the ultraviolet curable ink composition (or ink) according to the present invention exhibits such excellent storage stability that the time point that the viscosity is increased by 10% or more is 20 days or more after storage at 40° C., preferably 40 days or more, and more preferably 60 days or more. It achieves such excellent ink stability that no photopolymerization initiator is precipitated after ink preparation.

The ultraviolet curable ink composition forms a bezel pattern on a cover window film or a polarizing film layer. Even in a film having a low heat resistance, a pattern having high light-shielding property (e.g., OD>4) can be cured even with a low UV dose (e.g., <2,000 mJ/cm$^2$) without generation of surface wrinkle, thereby enabling UV curing without film deformation. In addition, due to excellent light-shielding characteristics at a low thickness, there are no problems of pattern visibility and step visibility of the panel and no bubble generation after OCA attachment. In addition, the folding (for example, folding radius 2.5R, 100,000 times or more) and the adhesion (for example, cross cut 5B) characteristics for application to the foldable device are excellent.

The top of the bezel pattern formed of the ultraviolet curable ink composition may be attached to an upper substrate through an adhesive layer for an upper substrate. The ultraviolet curable ink composition has excellent adhesive force with the adhesive for an upper substrate, such as an acrylic adhesive, a styrene butadiene rubber adhesive, an epoxy adhesive, a polyvinyl alcohol-based adhesive or polyurethane-based adhesive. With the ultraviolet curable ink composition, it can be obtained an effect of improving the adhesion between the bezel pattern and the upper substrate.

The method for producing a bezel pattern for a foldable display film according to the present invention uses the above ultraviolet curable ink composition.

In particular, the method for producing a bezel pattern for a foldable display film according to the present invention comprises the steps of a) printing the ultraviolet curable ink composition on a substrate in the shape of a bezel pattern; and b) curing the composition to form the bezel pattern.

Here, the cured bezel pattern may have a thickness of 1 to 5 µm or 2 to 4 µm.

In one embodiment of the present invention, the foldable display substrate may be a foldable display film.

In one embodiment of the present invention, the foldable display substrate may comprise a foldable display film.

In addition, the method for producing a bezel pattern for a display film of the present invention may further comprise a step of cleaning the film before the step a) of forming the bezel pattern. This is for selectively performing the surface treatment depending on the surface energy of the substrate to improve coating properties of the ink and to remove stains by foreign substances.

Specifically, the surface treatment may be performed by treatment of atmospheric pressure plasma, corona or the like.

The bezel pattern is characterized in that, as measured after curing, the taper angle is greater than 0° and 30° or less and the thickness is 0.1 to 20 µm. In addition, the taper angle may preferably be greater than 0 and 10° or less. In addition, the thickness may be preferably 0.5 to 5 µm. Since the bezel pattern of the present invention has the above characteristics, it may not exhibit short-circuit due to a large step, bubble generation, and deterioration of visual quality due to film release.

The optical density of the bezel pattern may be 4 to 5.5 on the basis of the film thickness of 4.0 µm, or 4.5 to 5, if necessary. In this case, there is an advantage that the shielding properties by the bezel pattern are excellent. If the optical density exceeds 5.5, the required content of the pigment to be added becomes very high, which may adversely affect the production of the ink and the inkjet process and may inhibit the ultraviolet curable ink composition from being cured by radiation.

The composition of the present invention can form a bezel having a high light-shielding property (O.D.>4) with a low UV dose by 1 layer printing on various substrates (film, glass, plastic, etc.), and there is no need for alignment required for 2 layer printing so that process time and cost (yield) can be improved.

The present invention provides a bezel pattern for a display substrate manufactured by the above method. In the present invention, the bezel pattern refers to a pattern formed at the edges of various devices such as a watch, a display device, and the like.

In one embodiment of the present invention, the display substrate may be a foldable display film.

In one embodiment of the present invention, the display substrate may comprise a foldable display film.

The bezel pattern is characterized in that, as measured after curing, the taper angle is greater than 0° and 30° or less and the thickness is 0.1 to 20 µm. In addition, the taper angle may preferably be greater than 0° and 10° or less. In addition, the thickness may be preferably 0.5 to 5 µm. Since the bezel pattern of the present invention has the above characteristics, it may not exhibit short-circuit due to a large step, bubble generation, and deterioration of visual quality due to film release.

The optical density of the bezel pattern may be 4 to 5.5 relative to the film thickness of 4.0 µm, or it may be 4.5 to 5, if necessary. In this case, there is an advantage that the shielding properties by the bezel pattern are excellent. If the optical density exceeds 5.5, the required content of the pigment to be added becomes very high, which may adversely affect the production of the ink and the inkjet process and may inhibit the ultraviolet curable ink composition from being cured by radiation.

In addition, the present invention provides a foldable display substrate comprising the bezel pattern.

The foldable display substrate may be a foldable display film.

The foldable display substrate may comprise a foldable display film.

The display substrate may be used for an organic light emitting diode (OLED).

Hereinafter, preferred examples are provided to help understanding of the present invention. However, it will be apparent to those skilled in the art that various modifications and variations can be made in the present invention without departing from the spirit or scope of the invention as set forth in the appended claims. Such changes and modifications are intended to be within the scope of the appended claims.

EXAMPLES

[Example 1] Preparation of Ultraviolet Curable Ink Composition

As shown in the following Table 1, pigment dispersion (15 parts by weight of carbon black, 3 parts by weight of a dispersant, 20 parts by weight of diethyl succinate), 6 parts by weight of Celloxide 2021P, 40.5 parts by weight of Oxetane 221, 2 parts by weight of an adhesion promoter (KBM-403), 10 parts by weight of a photopolymerization initiator (Speedcure 992), 3 parts by weight of a photosensitizer (DBA) and 0.5 part by weight of a surfactant (F-477) were mixed with stirring for 6 hours to prepare an ultraviolet curable ink composition of the present invention.

[Example 2] Preparation of Ultraviolet Curable Ink Composition

As shown in the following Table 1, pigment dispersion (16.5 parts by weight of carbon black, 3 parts by weight of a dispersant, 20 parts by weight of diethyl succinate), 6 parts by weight of Celloxide 2021P, 39 parts by weight of Oxetane 221, 2 parts by weight of an adhesion promoter (KBM-403), 10 parts by weight of a photopolymerization initiator (Speedcure 992), 3 parts by weight of a photosensitizer (DBA) and 0.5 part by weight of a surfactant (F-477) were mixed with stirring for 6 hours to prepare an ultraviolet curable ink composition of the present invention.

[Example 3] Preparation of Ultraviolet Curable Ink Composition

As shown in the following Table 1, pigment dispersion (18 parts by weight of carbon black, 3 parts by weight of a dispersant, 20 parts by weight of diethyl succinate), 6 parts by weight of Celloxide 2021P, 37.5 parts by weight of Oxetane 221, 2 parts by weight of an adhesion promoter (KBM-403), 10 parts by weight of a photopolymerization initiator (Speedcure 992), 3 parts by weight of a photosensitizer (DBA) and 0.5 part by weight of a surfactant (F-477) were mixed with stirring for 6 hours to prepare an ultraviolet curable ink composition of the present invention.

[Example 4] Preparation of Ultraviolet Curable Ink Composition

As shown in the following Table 1, pigment dispersion (16.5 parts by weight of carbon black, 3 parts by weight of a dispersant, 20 parts by weight of diethyl succinate), 6 parts by weight of Celloxide 2021P, 41 parts by weight of Oxetane 221, 2 parts by weight of an adhesion promoter (KBM-403), 8 parts by weight of a photopolymerization initiator (Speedcure 992), 3 parts by weight of a photosensitizer (DBA) and 0.5 part by weight of a surfactant (F-477) were mixed with stirring for 6 hours to prepare an ultraviolet curable ink composition of the present invention.

[Example 5] Preparation of Ultraviolet Curable Ink Composition

As shown in the following Table 1, pigment dispersion (16.5 parts by weight of carbon black, 3 parts by weight of a dispersant, 20 parts by weight of diethyl succinate), 8 parts by weight of Celloxide 2021P, 37 parts by weight of Oxetane 221, 2 parts by weight of an adhesion promoter (KBM-403), 10 parts by weight of a photopolymerization initiator (Speedcure 992), 3 parts by weight of a photosensitizer (DBA) and 0.5 part by weight of a surfactant (F-477) were mixed with stirring for 6 hours to prepare an ultraviolet curable ink composition of the present invention.

[Example 6] Preparation of Ultraviolet Curable Ink Composition

As shown in the following Table 1, pigment dispersion (16.5 parts by weight of carbon black, 3 parts by weight of a dispersant, 20 parts by weight of diethyl succinate), 6 parts by weight of Celloxide 2021P, 34 parts by weight of Oxetane 221, 5 parts by weight of neopentyl glycol diglycidyl ether, 2 parts by weight of an adhesion promoter (KBM-403), 10 parts by weight of a photopolymerization initiator (Speedcure 992), 3 parts by weight of a photosensitizer (DBA) and 0.5 part by weight of a surfactant (F-477) were mixed with stirring for 6 hours to prepare an ultraviolet curable ink composition of the present invention.

[Example 7] Preparation of Ultraviolet Curable Ink Composition

As shown in the following Table 1, pigment dispersion (16.5 parts by weight of carbon black, 3 parts by weight of a dispersant, 20 parts by weight of diethyl succinate), 6 parts by weight of Celloxide 2021P, 34 parts by weight of Oxetane 221, 5 parts by weight of cyclohexanedimethanol divinyl ether, 2 parts by weight of an adhesion promoter (KBM-403), 10 parts by weight of a photopolymerization initiator (Speedcure 992), 3 parts by weight of a photosensitizer (DBA) and 0.5 part by weight of a surfactant (F-477) were mixed with stirring for 6 hours to prepare an ultraviolet curable ink composition of the present invention.

[Example 8] Preparation of Ultraviolet Curable Ink Composition

As shown in the following Table 1, pigment dispersion (16.5 parts by weight of carbon black, 3 parts by weight of a dispersant, 20 parts by weight of diethyl succinate), 6 parts by weight of Celloxide 2021P, 39 parts by weight of Oxetane 221, 2 parts by weight of an adhesion promoter (KBM-403), 10 parts by weight of a photopolymerization initiator (CPI-210S), 5 parts by weight of a solvent (photopolymerization initiator solvent, propylene carbonate), 3 parts by weight of a photosensitizer (DBA) and 0.5 part by weight of a surfactant (F-477) were mixed with stirring for 6 hours to prepare an ultraviolet curable ink composition of the present invention.

[Comparative Example 1] Preparation of Ink Composition

As shown in the following Table 2, pigment dispersion (16.5 parts by weight of carbon black, 3 parts by weight of a dispersant, 20 parts by weight of diethyl succinate), 6 parts by weight of Celloxide 2021P, 42 parts by weight of Oxetane 221, 2 parts by weight of an adhesion promoter (KBM-403), 8 parts by weight of a photopolymerization initiator (Speedcure 992), 2 parts by weight of a photosensitizer (DBA) and 0.5 part by weight of a surfactant (F-477) were mixed with stirring for 6 hours to prepare an ink composition.

[Comparative Example 2] Preparation of Ink Composition

As shown in the following Table 2, pigment dispersion (16.5 parts by weight of carbon black, 3 parts by weight of a dispersant, 20 parts by weight of diethyl succinate), 6 parts by weight of Celloxide 2021P, 43 parts by weight of Oxetane 221, 2 parts by weight of an adhesion promoter (KBM-403), 6 parts by weight of a photopolymerization initiator (Speedcure 992), 3 parts by weight of a photosensitizer (DBA) and 0.5 part by weight of a surfactant (F-477) were mixed with stirring for 6 hours to prepare an ink composition.

[Comparative Example 3] Preparation of Ink Composition

As shown in the following Table 2, pigment dispersion (16.5 parts by weight of carbon black, 3 parts by weight of a dispersant, 20 parts by weight of diethyl succinate), 10 parts by weight of Celloxide 2021P, 35 parts by weight of Oxetane 221, 2 parts by weight of an adhesion promoter (KBM-403), 10 parts by weight of a photopolymerization initiator (Speedcure 992), 3 parts by weight of a photosensitizer (DBA) and 0.5 part by weight of a surfactant (F-477) were mixed with stirring for 6 hours to prepare an ink composition.

[Comparative Example 4] Preparation of Ink Composition

As shown in the following Table 2, pigment dispersion (16.5 parts by weight of carbon black, 3 parts by weight of a dispersant, 20 parts by weight of diethyl succinate), 6 parts by weight of Celloxide 2021P, 29 parts by weight of Oxetane 221, 10 parts by weight of neopentyl glycol diglycidyl ether, 2 parts by weight of an adhesion promoter (KBM-403), 10 parts by weight of a photopolymerization initiator (Speedcure 992), 3 parts by weight of a photosensitizer (DBA) and 0.5 part by weight of a surfactant (F-477) were mixed with stirring for 6 hours to prepare an ink composition.

[Comparative Example 5] Preparation of Ink Composition

As shown in the following Table 2, pigment dispersion (16.5 parts by weight of carbon black, 3 parts by weight of a dispersant, 20 parts by weight of diethyl succinate), 6 parts by weight of Celloxide 2021P, 29 parts by weight of Oxetane 221, 10 parts by weight of cyclohexanedimethanol divinyl ether, 2 parts by weight of an adhesion promoter (KBM-403), 10 parts by weight of a photopolymerization initiator (Speedcure 992), 3 parts by weight of a photosensitizer (DBA) and 0.5 part by weight of a surfactant (F-477) were mixed with stirring for 6 hours to prepare an ink composition.

[Comparative Example 6] Preparation of Ink Composition

As shown in the following Table 2, pigment dispersion (16.5 parts by weight of carbon black, 3 parts by weight of a dispersant, 20 parts by weight of diethyl succinate), 6 parts by weight of Celloxide 2021P, 38 parts by weight of Oxetane 221, 2 parts by weight of an adhesion promoter (KBM-403), 10 parts by weight of a photopolymerization initiator (Speedcure 992), 4 parts by weight of a photosensitizer (DBA) and 0.5 part by weight of a surfactant (F-477) were mixed with stirring for 6 hours to prepare an ink composition.

TABLE 1

|   |   | Ex. 1 | Ex. 2 | Ex. 3 | Ex. 4 | Ex. 5 | Ex. 6 | Ex. 7 | Ex. 8 |
|---|---|---|---|---|---|---|---|---|---|
| (A) | Carbon black | 15 | 16.5 | 18 | 16.5 | 16.5 | 16.5 | 16.5 | 16.5 |
|   | Acrylic dispersant | 3 | 3 | 3 | 3 | 3 | 3 | 3 | 3 |
|   | Diethyl succinate | 20 | 20 | 20 | 20 | 20 | 20 | 20 | 20 |
| (B) | Celloxide 2021P | 6 | 6 | 6 | 6 | 8 | 6 | 6 | 6 |
| (C) | OXT-221 | 40.5 | 39 | 37.5 | 41 | 37 | 34 | 34 | 39 |
| (D) | Neopentyl glycol digylcicyl ether |   |   |   |   |   | 5 |   |   |
|   | Cyclohexanedimethanol divinyl ether |   |   |   |   |   |   | 5 |   |
| (E) | KBM-403 | 2 | 2 | 2 | 2 | 2 | 2 | 2 | 2 |
| (F) | Speedcure 992 | 10 | 10 | 10 | 8 | 10 | 10 | 10 |   |
|   | CPI-210S |   |   |   |   |   |   |   | 5 |
| (G) | Propylene carbonate |   |   |   |   |   |   |   | 5 |
| (H) | DBA | 3 | 3 | 3 | 3 | 3 | 3 | 3 | 3 |
| (I) | F-477 | 0.5 | 0.5 | 0.5 | 0.5 | 0.5 | 0.5 | 0.5 | 0.5 |
|   | Ratio of (F) photopolymerization initiator (active only): (H) photosensitizer | 1.67 | 1.67 | 1.33 | 1.67 | 1.67 | 1.67 | 1.67 | 1.67 |
|   | Sum of (B) Celloxide 2021P + (C) OXT-221 | 46.5 | 45 | 43.5 | 47 | 45 | 40 | 40 | 45 |
|   | Ratio of (B) Celloxide 2021P: (C) OXT-221 | 6.75 | 6.50 | 6.25 | 6.83 | 4.63 | 5.67 | 5.67 | 6.50 |
|   | Weight ratio of initiator (F + G) relative to 100 of epoxy resin (B + C) | 17.2% | 17.8% | 18.4% | 14.9% | 17.8% | 20.0% | 20.0% | 17.8% |

TABLE 2

|   |   | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| (A) | Carbon black | 16.5 | 16.5 | 16.5 | 16.5 | 16.5 | 16.5 |
|   | Acrylic dispersant | 3 | 3 | 3 | 3 | 3 | 3 |
|   | Diethyl succinate | 20 | 20 | 20 | 20 | 20 | 20 |
| (B) | Celloxide 2021P | 6 | 6 | 10 | 6 | 6 | 6 |
| (C) | OXT-221 | 42 | 43 | 35 | 29 | 29 | 38 |
| (D) | Neopentyl glycol digylcicyl ether |   |   |   | 10 |   |   |
|   | Cyclohexanedimethanol divinyl ether |   |   |   |   | 10 |   |
| (E) | KBM-403 | 2 | 2 | 2 | 2 | 2 | 2 |
| (F) | Speedcure 992 | 8 | 6 | 10 | 10 | 10 | 10 |
|   | CPI-210S |   |   |   |   |   |   |
| (G) | Propylene carbonate |   |   |   |   |   |   |
| (H) | DBA | 2 | 3 | 3 | 3 | 3 | 4 |
| (I) | F-477 | 0.5 | 0.5 | 0.5 | 0.5 | 0.5 | 0.5 |
|   | Ratio of (F) photopolymerization initiator (active only): (H) photosensitizer | 2.00 | 1.00 | 1.67 | 1.67 | 1.67 | 1.25 |
|   | Sum of (B) Celloxide 2021P + (C) OXT-221 | 48 | 49 | 45 | 35 | 35 | 44 |
|   | Ratio of (B) Celloxide 2021P: (C) OXT-221 | 7.00 | 7.17 | 3.50 | 4.83 | 4.83 | 6.33 |

TABLE 2-continued

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Weight ratio of initiator (F + G) relative to 100 of epoxy resin (B + C) | 12.5% | 12.2% | 17.8% | 22.9% | 22.9% | 20.5% |

(A) Pigment dispersion: dispersed in diethyl succinate, a solvent; BK-5313 manufactured by Tokushiki
(B) Alicyclic epoxy: Celloixde 2021P manufactured by Daicel
(C) Oxetane: OXT-221 manufactured by Toagosei
(D) Monomer: Neopentyl glycol diglycidyl ether (LD-203, munufactured by Kukdo chemical), Cyclohexanedimethanol divinyl ether (CHDVE, manufactured by BASF)
(E) Adhesion promoter: KBM-403 munufactured by Shin-Etsu
(F) Photopolymerization initiator: Speedcure 992 is dissolved in a photopolymerization initiator solvent, propylene carbonate 50% and the actual solid content is 50%. The solid content of CPI-210S is 100%. Speedcure 992 manufactured by lambson, CPI-210S manufactured by San-Apro.
(G) Photopolymerization initiator solvent: 50% of Speedcure 992 consists of propylene carbonate.
(H) Photosensitizer: 9,10-Dibutoxyanthracene, manufactured by kawasaki, ANTHRACURE ™ UVS-1331)
(I) Surfactant: F-477, manufactured by DIC

[Examples 1 to 8 and Comparative Examples 1 to 6] Evaluation of Properties of Samples Prepared with Ink Compositions The ink compositions prepared in Examples 1 to 8 and Comparative Examples 1 to 6 were subjected to inkjet printing on a square TAC film having a size of 50 mm in width, 50 mm in length and 50 μm in thickness to have an optical density (OD, measured by X-rite 341C) of 5 and UV cured with a 395 nm UV LED lamp, thereby preparing a sample. The thickness of the sample, curing sensitivity, adhesion, dynamic folding, inkjet processability (idle time), surface wrinkle and ink stability were evaluated. The results are shown in Tables 3 and 4.

Here, the curing sensitivity was determined by using a UV LED lamp having a wavelength of 395 nm to detect UV energy at a tack free point. The adhesion was evaluated as 0B to 5B (Standard: ASTM D3002, D3359) through cross-cut test. The dynamic folding was evaluated by confirming the occurrence of cracks by folding 100,000 times at a folding radius of 2.5R using a film folding test machine (model: STS-VRT-5AXIS, Sciencetown). The inkjet processability was determined by jetting evaluation according to short purge (3s) and idle time after wiping, with the ink being discharged from all nozzles. The surface wrinkles were evaluated by visually confirming whether the surface wrinkles are formed after UV curing. The ink stability was evaluated by storing the ink in an oven at 45° C. to confirm viscosity increase of 10% or less and precipitation of photopolymerization initiator within 1 week. In the evaluation of surface wrinkles and ink stability in Tables 3 and 4 below, OK sign means excellent, NG sign means not good.

TABLE 3

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Printed thickness (μm) | 4.5 | 4 | 3.5 | 4 | 4 | 4 | 4 | 4 |
| Optical density | 5 | 5 | 5 | 5 | 5 | 5 | 5 | 5 |
| Cross cut | 5B | 5B | 5B | 5B | 5B | 5B | 5B | 5B |
| Dynamic folding | >100K | >100K | >100K | >100K | >100K | >100K | >100K | >100K |
| Curing sensitivity (mJ/cm$^2$) | 2,000 | 2,000 | 2,000 | 2,000 | 2,000 | 2,000 | 2,000 | 2,000 |
| Inkjet processability (idle time) | 10 min | 10 min | 5 min | 10 min | 10 min | 10 min | 10 min | 10 min |
| Surface wrinkles | OK | OK | OK | OK | OK | OK | OK | OK |
| Ink stability | OK | OK | OK | OK | OK | OK | OK | OK |

TABLE 4

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Printed thickness (μm) | 4 | 4 | 4 | 4 | 4 | 4 |
| Optical density | 3.2 | 3.2 | 2.8 | 3 | 3 | 5 |
| Cross cut | 0B | 0B | 0B | 0B | 0B | 5B |
| Dynamic folding | — | — | — | — | — | >100K |
| Curing sensitivity (mJ/cm$^2$) | 2,000 | 2,000 | 2,000 | 2,000 | 2,000 | 2,000 |
| Inkjetprocessability (idle time) | 10 min | 10 min | 10 min | 10 min | 10 min | 10 min |
| Surface wrinkles | NG | NG | NG | NG | NG | OK |
| Ink stability | OK | OK | OK | OK | OK | NG |

As shown in Table 1 and Table 3, the ink compositions of Examples 1 to 8 showed excellent results in adhesion, dynamic folding, curing sensitivity, inkjet processability, surface wrinkles and ink stability. Specifically, in the ink composition of Example 1 which comprises 15% of carbon black and 20% of a solvent (diethyl succinate), the thickness is 4.5 μm at O.D. 5 and there are no surface wrinkles generated. In the composition of Example 2 in which the content of carbon black in Example 1 is changed to 16.5%, the thickness is 4 μm at O.D. 5 and there are no surface wrinkles generated. In the composition of Example 3 in which the content of carbon black in Example 1 is changed to 18%, the thickness is 3.5 μm at O.D. 5 and there are no surface wrinkles generated. In the composition of Example 4 in which the content of the photopolymerization initiator speedcure 992 in Example 2 is lowered from 10% to 8%, there are no surface wrinkles generated. In the composition of Example 5 in which the content of alicyclic epoxy compound (Celloxide 2021P) in Example 2 is increased from 6% to 8%, there are no surface wrinkles generated. In the composition of Example 6 in which a part of the oxetane compound in Example 2 is replaced with 5% of glycidyl ether, there are no surface wrinkles generated. In the composition of Example 7 in which a part of the oxetane compound in Example 2 is replaced with 5% of vinyl ether, there are no surface wrinkles generated. In the composition of Example 8 in which the photopolymerization initiator Speedcure 992 in Example 2 is changed to CPI-210S, there are no surface wrinkles generated. In contrast, in the composition of Comparative Example 1 in which the content of photopolymerization initiator Speedcure 992 in Example 2 is lowered from 10% to 8% and the content of photosensitizer is lowered from 3% to 2% and thus the sum of the photosensitizer and the photopolymerization initiator is 12.5 parts by weight based on 100 parts by weight of the sum of the alicyclic epoxy compound and the oxetane compound, there are surface wrinkles generated. In the composition of Comparative Example 2 in which the content of photopolymerization initiator Speedcure 992 in Example 2 is lowered from 10% to 6% and thus the sum of the photosensitizer and the photopolymerization initiator is 12.2 parts by weight based on 100 parts by weight of the sum of the alicyclic epoxy compound and the oxetane compound, there are surface wrinkles generated. In the composition of Comparative Example 3 in which the content of alicyclic epoxy compound (Celloxide 2021P) in Example 2 is increased from 6% to 10% and thus the ratio of the alicyclic epoxy compound: the oxetane compound is 1:3.5, there are surface wrinkles generated. In the composition of Comparative Example 4 in which a part of the oxetane compound in Example 2 is replaced with 10% of glycidyl ether and thus the sum of the photosensitizer and the photopolymerization initiator is 23 parts by weight based on 100 parts by weight of the sum of the alicyclic epoxy compound and the oxetane compound, there are surface wrinkles generated. In the composition of Comparative Example 5 in which a part of the oxetane compound in Example 2 is replaced with 10% of vinyl ether and thus the sum of the photosensitizer and the photopolymerization initiator is 23 parts by weight based on 100 parts by weight of the sum of the alicyclic epoxy compound and the oxetane compound, there are surface wrinkles generated. In the composition of Comparative Example 6 in which the content of photosensitizer in Example 2 is increased from 3% to 4%, the photosensitizer is precipitated and the ink stability is not good.

While the present invention has been particularly shown and described with reference to the particular embodiments thereof, it will be apparent to those skilled in the art that these specific descriptions are only preferred embodiments and that the scope of the invention is not limited thereby. Accordingly, the actual scope of the present invention will be defined by the appended claims and their equivalents.

What is claimed is:

1. An ultraviolet curable ink composition for forming a bezel pattern of a foldable display substrate, comprising:
   a black pigment;
   a dispersant;
   an alicyclic epoxy compound;
   an oxetane compound;
   a photosensitizer present in an amount of 1 to 3% by weight based on the total weight of the ink composition;
   a photopolymerization initiator; and
   an organic solvent,
   wherein a weight ratio of the photosensitizer to photopolymerization initiator is 1:1 to 1:2,
   wherein a weight ratio of the alicyclic epoxy compound to the oxetane compound is 1:4 to 1:8, and a sum of the amounts of the photosensitizer and the photopolymerization initiator is 13 to 21 parts by weight based on 100 parts by weight of a sum of the amounts of the alicyclic epoxy compound and the oxetane compound.

2. The ultraviolet curable ink composition according to claim 1, wherein the organic solvent has a boiling point of 200° C. or more and a viscosity of 1 to 5 cP at 25° C.

3. The ultraviolet curable ink composition according to claim 1, wherein the organic solvent is at least one selected from the group consisting of butyl diglyme, dipropylene glycol methyl ether acetate, ethylene glycol dibutyrate, diethyl succinate, gamma-butyrolactone and ethyl caprate.

4. The ultraviolet curable ink composition according to claim 1, wherein the black pigment is selected from the group consisting of a carbon black pigment, a lactam black pigment, a perylene black pigment or a combination thereof, and the black pigment is present in an amount of 5 to 25% by weight based on the total ink composition.

5. The ultraviolet curable ink composition according to claim 1, wherein the dispersant is selected from the group consisting of acrylics, polyalkylene glycols and esters thereof, polyoxyalkylene polyhydric alcohols, ester alkylene oxide adducts, alcohol alkylene oxide adducts, sulfonic acid esters, sulfonates, carboxylic acid esters, carboxylates, alkylamide alkylene oxide adducts, alkylamines, and mixtures thereof, and the dispersant is present in an amount of 0.5 to 5% by weight based on the total weight of the ink composition.

6. The ultraviolet curable ink composition according to claim 1, wherein the alicyclic epoxy compound is selected from the group consisting of dicyclopentadiene dioxide, limonene dioxide, (3,4-epoxycyclohexyl)methyl-3,4-epoxycyclohexanecarboxylate, 3-vinylcyclohexene oxide, bis(2,3-epoxycyclopentyl)ether, bis(3,4-epoxycyclohexylmethyl)adipate, bis(3,4-epoxy-6-methylcyclohexylmethyl)adipate, (3,4-epoxycyclohexyl)methyl alcohol, (3,4-epoxy-6-methylcyclohexyl)methyl-3,4-epoxy-6-methylcyclohexanecarboxylate, ethylene glycol bis(3,4-epoxycyclohexyl)ether, 3,4-epoxycyclohexene carboxylic acid ethylene glycol diester, and (3,4-epoxycyclohexyl)ethyltrimethoxysilane, and the alicyclic epoxy compound is present in an amount of 2 to 15% by weight based on the total weight of the ink composition.

7. The ultraviolet curable ink composition according to claim 1, wherein the oxetane compound is selected from the group consisting of 3-ethyl-3-hydroxymethyloxetane, 1,4- bis[(3-ethyl-3-oxetanyl)methoxymethyl]benzene, 3-ethyl-3-(phenoxymethyl)oxetane, di[(3-ethyl-3-oxetanyl)methyl] ether, 3-ethyl-3-(2-ethylhexyloxymethyl)oxetane, 3-ethyl-3-cyclohexyloxymethyl oxetane, and phenol novolak oxetane, and the oxetane compound is present in an amount of 25 to 50% by weight based on the total weight of the ink composition.

8. The ultraviolet curable ink composition according to claim 1, wherein the organic solvent is present in an amount of 20 to 25% by weight based on the total weight of the ink composition.

9. The ultraviolet curable ink composition according to claim 1, wherein the photopolymerization initiator is a sulfonium salt.

10. The ultraviolet curable ink composition according to claim 1, further comprising:
an adhesion promoter, wherein the adhesion promoter is present in an amount of 1 to 5% by weight based on the total weight of the ink composition.

11. The ultraviolet curable ink composition according to claim 10, wherein the adhesion promoter is at least one selected from the group consisting of an alkoxysilane compound and phosphate-based acrylate, wherein the alkoxysilane compound is selected from the group consisting of 3-glycidoxypropyl trimethoxysilane, 3-glycidoxypropyl methyldimethoxysilane, 2-(3,4-epoxycyclohexyl)ethyltrimethoxysilane, 3-glycidoxypropyl methyldiethoxysilane, 3-glycidoxypropyl triethoxysilane and 3-methacryloxypropyl trimethoxysilane.

12. The ultraviolet curable ink composition according to claim 1, wherein the ultraviolet curable ink composition has a curing dose of 100 to 5,000 mJ/cm$^2$ and is cured by absorbing radiation in a wavelength range of 250 nm to 410 nm.

13. The ultraviolet curable ink composition according to claim 1, wherein the ultraviolet curable ink composition, after curing, has adhesive force to the substrate of 4B or more in a cross cut test according to ASTM D3002 or D3359, and no crack occurred after folding 100,000 times at a folding radius of 2.5R.

14. A method for producing a bezel pattern for a foldable display substrate, comprising:
a) inkjet printing the ultraviolet curable ink composition of claim 1 on a substrate in the shape of a bezel pattern; and
b) curing the ultraviolet curable ink composition to form the bezel pattern.

15. The method for producing a bezel pattern for a foldable display substrate according to claim 14, wherein the bezel pattern has a thickness of 1 to 5 μm and an optical display OD value of 4 or more.

16. A bezel pattern formed by curing the ultraviolet curable ink composition according to claim 1.

17. A foldable display substrate comprising the bezel pattern according to claim 16.

18. The foldable display substrate according to claim 17, wherein the foldable display substrate comprises a foldable display film.

\* \* \* \* \*